FIG. 1

INVENTOR
EVERETT N. CASE

United States Patent Office 3,743,725
Patented July 3, 1973

3,743,725
PROCESS FOR THE RECOVERY IN USEFUL FORM OF FLUORINE VALUES FROM PHOSPHATE ROCK WHILE PRODUCING PHOSPHORIC ACID
Everett N. Case, Media, Pa., assignor to Atlantic Richfield Company, New York, N.Y.
Continuation-in-part of application Ser. No. 774,960, Nov. 12, 1968. This application Nov. 4, 1971, Ser. No. 195,736
Int. Cl. C01f 1/00; C01b 25/16
U.S. Cl. 423—166
14 Claims

ABSTRACT OF THE DISCLOSURE

Fluorine values can be recovered from a wet process phosphoric acid stream in substantial quantities in a form that is easily convertible to hydrogen fluoride comprising reacting fluorine-containing phosphate rock with phosphoric acid having a $P_2O_5$ concentration between about 20 to 50 percent and being unsaturated with respect to fluorine in an attack stage at temperatures below 180° F. to dissolve at least about 90 percent of the phosphate values in the rock and to solubilize the fluorine values in the rock, thereafter lowering the temperature of said stream to precipitate out the fluorine values in a useful form.

---

Figure 2:
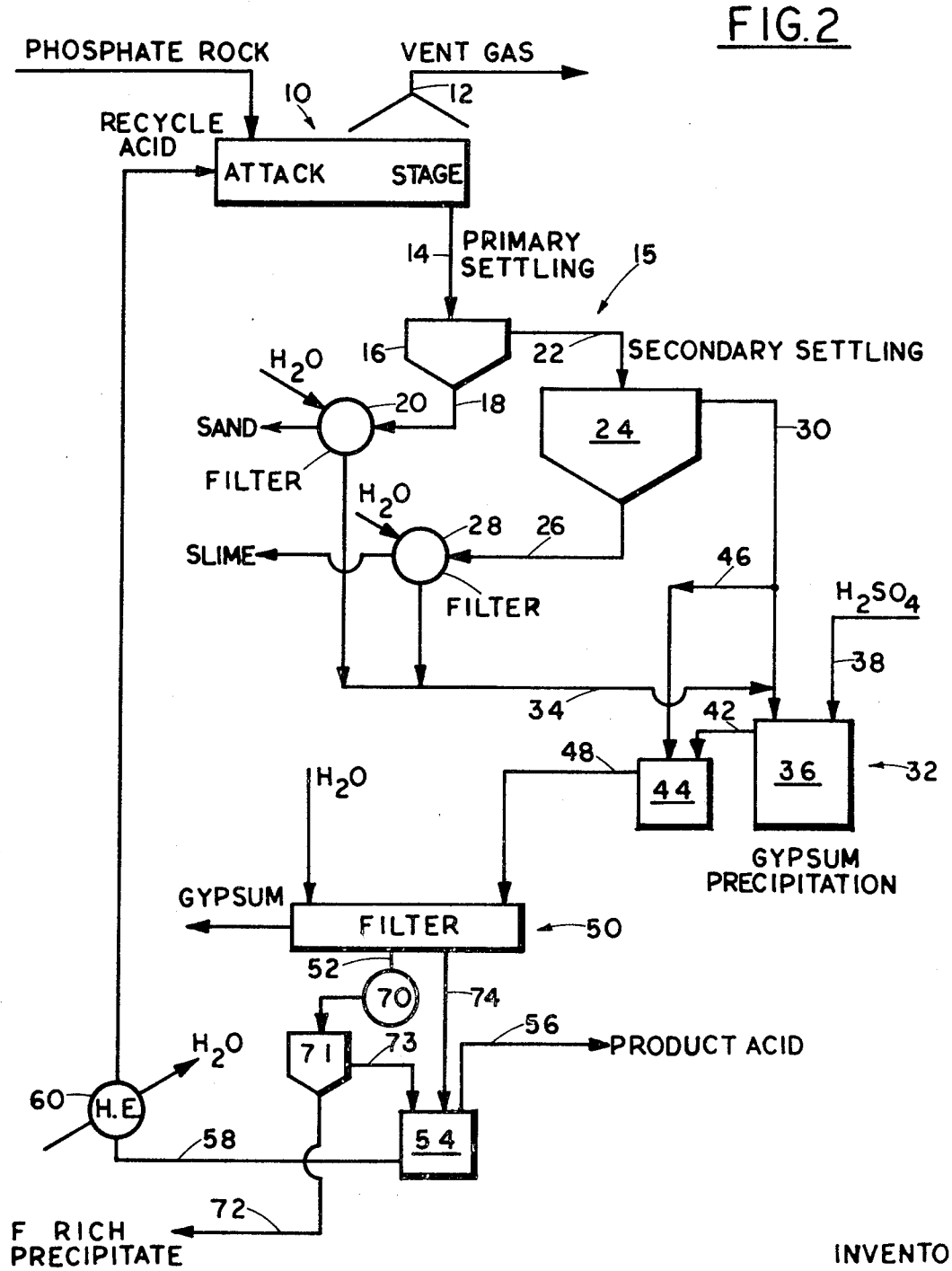

This is a continuation-in-part of my copending application, Ser. No. 774,960, filed Nov. 12, 1968, entitled "Process for Producing Phosphoric Acid," now U.S. Pat. 3,619,136.

This invention relates to the process of my copending application for the digestion of naturally-occurring phosphate rock at temperatures below about 180° F. to recover the phosphate values therein, and more particularly, to an improved wet process for the digestion of phosphate material and the production of phosphoric acid of good purity as well as calcium sulfate of relatively high purity. It is particularly directed to the recovery of fluorine values which are naturally-occurring in said phosphate rock in a precipitate that is easily convertible to hydrogen fluoride after removal from the process stream.

BACKGROUND OF THE INVENTION

In the manufacture of phosphoric acid from phosphate rock, fluorine which is present in most, if not all, commercial rocks, give rise to considerable problems. It is desired to obtain a phosphoric acid product of low fluorine concentration and, in addition, in many reaction systems the fluorine can appear in deleterious forms which cause considerable difficulty and increase materially the cost of manufacturing phosphoric acid.

With regard to the problems derived from the presence of fluorine in phosphate rock, there are three reactions which can occur in various systems for producing phosphoric acid and these reactions are:

(1) $CaF_2 + \text{Strong acid (e.g. } H_2SO_4) \rightarrow CaSO_4 + HF$ (2) $HF + SiO_2 \rightarrow SiF_4$ (3) $SiF_4 + H_2O \rightarrow H_2SiF_6 + SiO_2$ Strong mineral acids, for instance sulfuric acid, are employed as a reactant in most of the processes for making phosphoric acid; and these strong acids participate in Reaction 1 above. Thus, it is seen that if at the time of using the strong acid, calcium fluoride is present then hydrogen fluoride is an intermediate product. Most prior workers have considered this formation of hydrogen fluoride as giving a desirable route for defluorinating the system. Thus, the hydrogen fluoride reacts with silica to form silicon tetrafluoride which can leave the system as a gas.

Silica is naturally present in the operation since it is a common constituent of phosphate rock; and in some situations where such silica content has been insufficient, additional amounts have been purposely added to react with hydrogen fluoride and thereby form increased amounts of silicon tetrafluoride to denude the system of as much fluorine as possible. This manner of reducing the fluorine content of the system results in considerable expense since silicon tetrafluoride is highly corrosive and special gas handling and disposal facilities must be provided. Moreover, Reaction 3 above shows that at least some of the silicon tetrafluoride reacts with water to form fluosilicic acid which eventually appears as such in the phosphoric acid product or is transformed into insoluble and undesirable fluosilicates which can increase the retention of gypsum scale in the process equipment. Undue amounts of fluorine in the phosphoric acid make it less acceptable for use, for instance, in the manufacture of animal feeds and high analysis fertilizers.

My copending application, Ser. No. 774,960, now U.S. Pat. 3,619,136, describes a process whereby the reactants may be controlled through a sequence of processing steps and by controlling the operating conditions for each step. Briefly, the phosphate rock is treated with a dilute solution of phosphoric acid, said solution being equilibrated with respect to all of the soluble materials found in phosphate rock other than phosphate, at temperatures below 180° F. such that the phosphate values of the rock are placed in solution and the various impurities and undesired constituents of the rock, including the fluorine in the form of calcium fluoride, remain solids and are filtered off and collected in what is referred to as a slime stream. It is further noted therein that this slime stream is a potential source of fluorine although the amount of fluorine in the stream is small in proportion to the other materials.

It has now been determined that through some modifications in the process of the aforementioned application all of the benefits described therein are still pertinent; and additionally it is possible to obtain fluorides in a precipitate that is rich in fluoride value and in a form which can be easily converted to hydrogen fluoride once it has been removed from the process stream. The phosphate containing rock is still treated in the attack stage at temperatures below 180° F. and preferably between 70° and 150° F. with phosphoric acid having a $P_2O_5$ concentration of between 20 and 50 percent; preferably between 25 and 40 percent. The rate of introducing the phosphoric acid will preferably be such that the monocalcium phosphate dissolved in the slurry will be between 50 percent and 90 percent of the equilibrium solubility of the monocalcium phosphate in the acid.

The phosphoric acid stream of the present application will not be in the equilibrium state with respect to fluorine when admitted to the attack stage. This can be accomplished by cooling the acid stream at one of various places in the process to cause fluorides to precipitate out. The degree of cooling of the phosphoric acid stream will generally depend upon the fluorine concentration in the rock, and it is only necessary to cool the stream to effectively remove sufficient fluorides through precipitation such that the stream on recycle can continually solubilize substantially all of the fluorine values of the rock. As a general guide, cooling to temperatures between about 70 and 95° F. will accomplish this goal. The fluoride solubility in the acid stream is highly dependent upon temperature while the solubility of the monocalcium phosphate is only slightly affected over the operating temperature range. Therefore, when the phosphoric acid stream is introduced into the attack stage, it will solubilize fluorine as well as the monocalcium phosphate.

Under the relatively mild conditions of the attack stage, as hereinbefore described, this solubilizing of the fluorine will not affect the silica nor produce the $SiF_4$ or fluosilicates which heretofore have created corrosion and/or clean-up problems while tying up the fluorides in a state that is difficult to separate.

Figure 1:
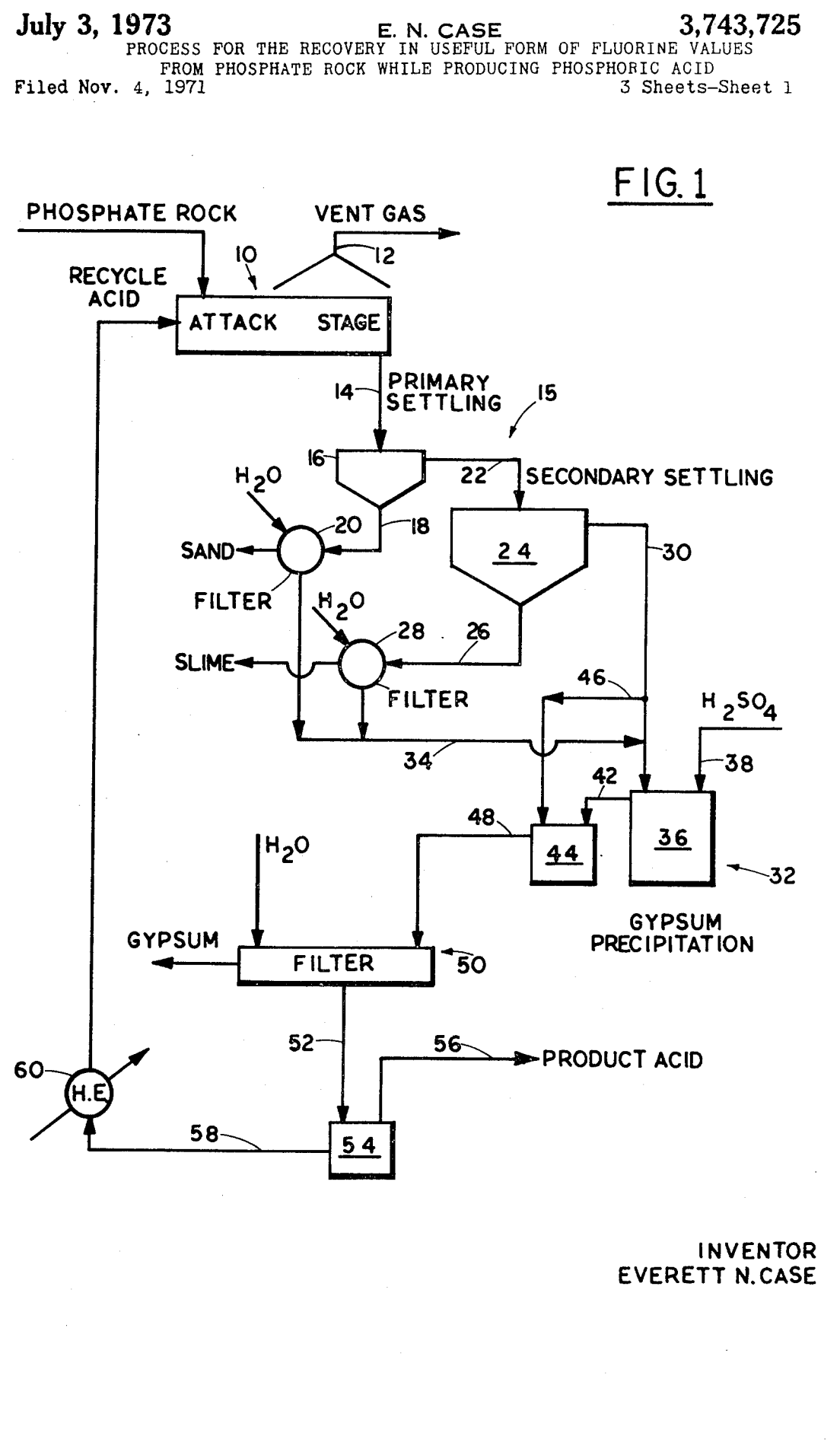
Figure 3:
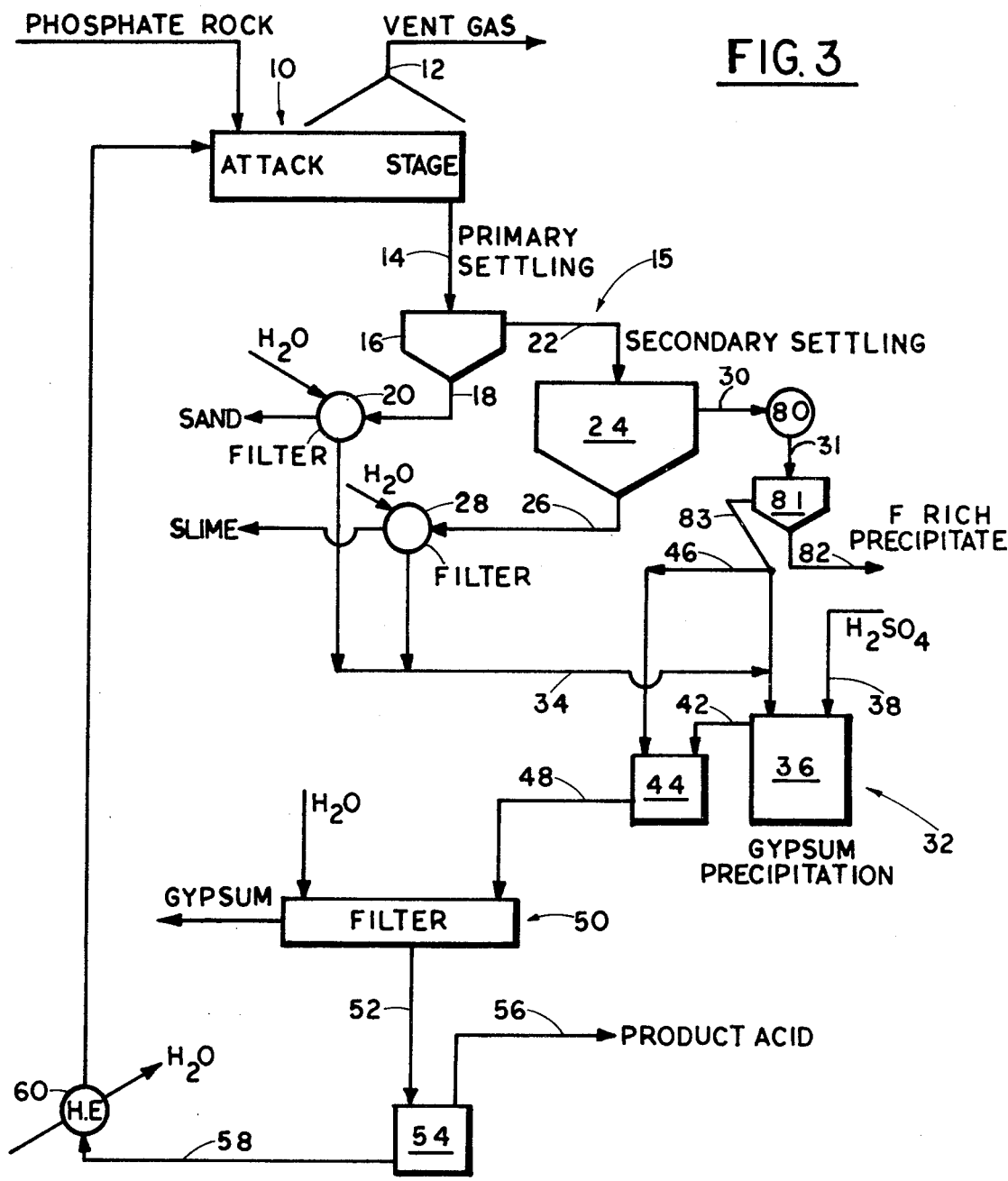

FIG. 1 corresponds to FIG. 3 of the parent application (now U.S. Pat. 3,619,136) which utilizes a dilute solution of phosphoric acid, equilibrated with respect to the materials found in phosphate rock other than the phosphate values, such that the solution produced in the attack stage is a monocalcium phosphate-phosphoric acid and water solution. This stream is filtered and then treated with up to the stoichiometric amount of sulfuric acid to cause a gypsum precipitate which can be removed from the stream. Part of the remaining phosphoric acid stream is recycled to treat more rock in the attack stage. Through proper temperature control the acid being introduced to the attack stage will always be equilibrated with respect to the undesirable rock components such as fluorine, calcium sulfate, $Al_2O_3$ and $Fe_2O_3$.

FIGS. 2 and 3 are schematic diagrams of the process of the present invention including the use of coolers to get a fluorine precipitate (1) after the removal of the gypsum or (2) before the introduction of the sulfuric acid to the phosphoric acid stream, respectively. These processes, and particularly the process of FIG. 2, may require a heater to raise the temperature of the recycle portion of the phosphoric acid stream to the attack stage temperature in order to leave the stream unsaturated with respect to the fluorine values found in the rock. Therefore, the recycle acid stream on contacting the phosphate rock in the attack stage will solubilize the phosphate and fluorine values.

In general, weight ratios of the $P_2O_5$ in the digesting acid to the $P_2O_5$ in the phosphate rock can be on the order of at least about 7 to say about 25:1, or higher, e.g. up to about 80 or 100:1 and above. The lower value for recycle ratio is, in fact, determined by the amount of phosphate in the rock and the amount which can be dissolved by the digesting acid to provide an acid containing the above discused concentration of monocalcium phosphate. Accordingly, once the $P_2O_5$ concentration in the digesting acid is selected, the acid to rock ratio is committed where it is desired to produce a slurry containing a particular amount of monocalcium phosphate in solution.

The product of the attack stage is a slurry comprising a monocalcium phosphate and phosphoric acid-water solution containing dissolved materials including the newly solubilized fluorides and solids which include the potentially soluble and insoluble portion of the $R_2O_3$ components, calcium sulfate and some calcium fluoride, as well as silica which is insoluble. The solids can be separated from the slurry, e.g. by conventional procedures such as settling, decanting, filtering, centrifugation, etc. It is most desired to obtain a monocalcium phosphate solution essentially free of solid and colloidal materials and, preferably, the suspended materials in the separated solution do not exceed about 4 grams per liter of solution. The suspended materials can be present in the range of less than about 2 to 3 grams, and often less than about 1 to 2 grams, per liter of separated solution.

The particular separation procedure chosen is usually a matter of economics. For many applications, a filter or a settling system, particularly a two-stage settling system, will be satisfactory. In a two-stage settling system, the primary settling stage can first remove silica and any other large solids with a settling time on the order of about 15 minutes to one hour. Subsequently, the secondary settling step can remove the "slime" remaining, which can be composed generally of particles in the size range of up to about 50 microns, often about 3 to 50 microns, and contains some calcium sulfate, the $R_2O_3$, and possibly some calcium fluoride. Settling times of about 6 to 15 hours are suitable for slime removal. When using a settling system, a further criteria on the $P_2O_5$ concentration of the digesting acid and on the concentration of monocalcium phosphate in the solution obtained from the attack system, can be considered since, as the monocalcium phosphate concentration in the product solution increases, the density of the product solution approaches the density of the solids which are to be settled. Also, the viscosity increases and, as the density and viscosity increase, the rate of settling may decrease to a point where the solids will not settle. At this point the use of filtration alone may suffice.

The residue from the separation system, e.g. from both the primary and secondary settling steps will, preferably, be washed with water and/or recycle acid to reduce the phosphates in the residue and the wash waters added to the solution obtained from the secondary settling step. It can also be desirable to provide temperature control in the separation system since the amount of phosphorus values lost as iron and aluminum phosphates in the slime is a function of temperature. Fluoride values would also be lost with any drop in temperature, and it is desired to minimize these losses. When temperature control is desired, the temperature of the separation stage will be held at, or slightly above, the temperature of the attack stage, e.g. up to about 210° F., but below the boiling point of the solution. It is possible to heat the solution at this point without a foaming problem since this solution is a highly concentrated monocalcium phosphate solution. Hydrogen fluoride will tend not to be produced upon heating since the presence of large amounts of monocalcium phosphate suppresses the reaction of calcium fluoride and phosphoric acid to produce hydrogen fluoride. Also, since the silica from the rock is removed in the first part of the separation stage and is not present in significant amounts to react with hydrogen fluoride, silicon tetrafluoride will not be produced in material quantities. The solubility of hydrogen fluoride in the system is much greater than that of silicon tetrafluoride so that, even if some hydrogen fluoride be produced, it will tend to remain in solution.

In the present invention the problems of prior processes are overcome by controlling the digestion step in the following ways: the rock digestion or attack stage is maintained below 180° F., and preferably below 150° F., the recycle acid is unsaturated with respect to fluorine to the extent that essentially all fluorine values in the rock can be solubilized, and the ratio of $P_2O_5$ in the acid to $P_2O_5$ content in the rock is high, i.e. at least about 7:1, and preferably at least about 9 and up to about 100:1, which for a typical rock and typical acid concentration is a weight ratio of acid to rock of at least about 5:1, preferably about 10:1 and up to about 30:1. The net result of using mild reaction conditions, relatively low acid concentrations, high ratios of acid to rock, and an acid unsaturated with respect to fluoride values is to produce a solution of monocalcium phosphate from rock in which substantially only the calcium phosphate values and the fluoride values of the rock are taken into solution. There are apparently relatively small amounts, if any, new fluorine compounds produced not native to the rock, e.g. $SiF_4$ or fluosilicates, and essentially no phosphate values need be left undissolved in the rock. In short, the improved process can give substantially quantitative conversion of tricalcium phosphate into monocalcium phosphate and substantially all of the fluorine values in the rock go into solution as fluorides.

The recycle acid in the terms of this process, as defined above, is a phosphoric acid of the appropriate concentration which is substantially less than saturated with respect to monocalcium phosphate and fluorine at the time of entry into the attack stage. For example, the acid is essentially saturated with respect to calcium sulfate and iron and aluminum compounds. It may or may not be saturated with respect to the minor components such as magnesium, sodium, potassium, etc. The manner in which an appropriate acid can be obtained is by contact of any phosphoric acid, e.g., furnace grade or commercial grade, with rock as the first step. The dissolved calcium is then removed as calcium sulfate by the addition of sulfuric acid to reduce the saturation with respect to monocalcium phosphate. The resultant phosphoric acid is returned to its original concentration by adjusting the water content. This acid is then used to re-contact rock, etc.

The use of an acid in the ratios designated for the present invention avoids strongly attacking the phosphate rock. Accordingly, the undesirable components of the rock cannot go into the acid solution in the attack stage but, since the acid is not saturated with monocalcium phosphate or fluorine, the phosphate and fluorine can go essentially completely into solution. Therefore, when the phosphoric acid reacts with the phosphate rock to form monocalcium phosphate, the calcium fluoride for the most part is also dissolved. Control of the temperature also inhibits reaction of phosphoric acid with the calcium fluoride to produce hydrogen fluoride. Accordingly, virtually all impurities in the rock, except the carbonates and fluorides, will remain in solid form following the attack system, including silica, iron, aluminum, etc., thereby leaving on separation a relatively clear solution of monocalcium phosphate in phosphoric acid and water including the solubilized fluorides. The solids are removed either as sand or slime, which will contain the insolubles including some metal phosphates. The removal of the impurities in solid form avoids the problems inherent in the formation of hydrogen fluoride and silicon tetrafluoride, foaming, etc., and relatively pure phosphoric acid and gypsum can be produced from this solution.

The monocalcium phosphate solution can be cooled to partially precipitate out the fluoride values or be passed directly into a precipitation stage where sulfuric acid is added to precipitate calcium sulfate as the dihydrate, hemihydrate, or anhydrite; depending upon the conditions chosen, particularly temperature and acid concentration. The temperature at which precipitation occurs will generally determine the form of calcium sulfate produced. In general, for the acid concentrations used, the dihydrate is produced at temperatures in the range of about 150° to 215° F., the hemihydrate at temperatures in the range of about 175° to 275° F., and the anhydrite at temperatures between about 225° F. and the boiling point of the solution.

Sulfuric acid is added to the precipitation stage in an amount essentially stoichiometric, e.g. at least about 90 percent stoichiometric, and preferably higher, with regard to the calcium, as phosphate or carbonate present but not calcium present as calcium fluoride, to precipitate essentially all of the calcium as calcium sulfate in the desired hydrated state and produce phosphoric acid. To the extent that the amount of sulfuric acid exceeds stoichiometric, sulfuric acid is introduced into the digestion system and many of the problems solved by the instant process may appear, especially precipitation in the attack stage of calcium as calcium sulfate. Below stoichiometric, the chemistry of the process is in accordance with this invention but the economics of the process become less desirable since the size of the plant required goes up.

Although stoichiometric amounts of sulfuric acid are used in the precipitation stage of the present invention, it is known that for the production of easily filterable crystals of calcium sulfate, e.g. gypsum, it is desirable to have an excess of sulfuric acid present during precipitation. Accordingly, a slip stream or minor portion of the clear monocalcium phosphate solution can be diverted prior to the precipitation stage and all the sulfuric acid to be used is added to the remaining major portion of the monocalcium phosphate system, temporarily providing an excess of sulfuric acid for the monocalcium phosphate solution and thereby producing good crystals. The slip stream is then combined with the slurry of crystals and phosphoric acid produced in the precipitation stage to neutralize the excess sulfuric acid and produce additional crystals and phosphoric acid. Therefore, across the entire precipitation stage an essentially stoichiometric amount of sulfuric acid can be used, although internally an excess of sulfuric acid can appear in a portion thereof. The amount of the slip stream will depend upon the concentration of the monocalcium phosphate solution but can be on the order of about 10 to 50, preferably about 15 to 30, weight percent of the solution. Precipitation times in the presence of the excess sulfuric acid can be on the order of about 1 to 7 hours, or more, preferably about 3 to 5 or 7 hours. Sulfuric acid of any commercial grade, e.g. about 93 to 97 percent, is suitable and the preferred concentration depends upon water and heat balances for the system. The slurry removed from the precipitation stage can be filtered according to conventional procedures, for example, with a Prayon or other conventional filter to remove the calcium sulfate crystals from the phosphoric acid. The phosphoric acid, if not cooled earlier, will be cooled to partially precipitate out the fluorine values, and will be recycled to the attack stage to provide the phosphoric digesting acid. A portion of the acid will be removed as product.

The advantages of the system in accordance with the present invention are substantial. The raw material costs are reduced since substantial amounts of sulfuric acid are not consumed to convert calcium fluoride to hydrogen fluoride which would be lost through conversion to silicon tetrafluoride. Fluoride values can be recovered in good quantity in a usable form. The excess sulfuric acid desired to make good calcium sulfate crystals can be utilized to scavenge a portion of the monocalcium phosphate solution and precipitate additional calcium sulfate. By considerably avoiding formation of hydrogen fluoride and silicon tetrafluoride, the system has decreased pollution and recovery systems, decreased corrosion problems, increased acid purity, increased gypsum purity, decreased foam problems, etc. Furthermore, in the present invention, it is unnecessary to grind the phosphate rock, particularly as fine as heretofore. Furthermore, the silica, or sand stream recovered in the separation stage is a relatively high quality source of quartz. Also, the calcium fluoride in the slime is a potential source of fluorine and the phosphate values in the slime can be recovered, if desired. Fuorine can also be recovered when the product acid is concentrated.

Referring now to FIG. 1, which illustrates the system described in the parent application, now U.S. Pat. 3,619,136, phosphate rock is introduced into attack stage 10 and reacted with a digesting acid to produce a slurry comprising a monocalcium phosphate-phosphoric acid-water solution containing insoluble materials. The carbon dioxide evolved in this reaction is removed through line 12. The slurry is removed from attack stage 10 through line 14 and passed to the separation stage, generally designated as 15. As illustrated in FIG. 1, the separation stage is a two-stage settling system. The slurry is passed into primary settling tank 16 in which the heavier particles, predominantly silica, or sand, are settled and removed via line 18. The sand is collected and washed in filter 20 to recover soluble materials, predominantly phosphates, which may be removed with the sand from tank 16. The slurry passes from settling tank 16 through line 22 to secondary settling tank 24 where the smaller particles of insoluble materials are removed. The smaller particles, known as slime, often are in the size range of about 3 to 50 microns and settle slower than the sand. The slime is removed from tank 24 through line 26, separated in filter 28 and washed. It can be desirable, particularly with short residence times in the attack stage 10, to first wash the slime, or a mixture of slime and sand with the process equilibrium acid to scavenge any phosphate values remaining therein.

The liquid removed from tank 24 is an essentially clear monocalcium phosphate-phosphoric acid-water solution and is conveyed through line 30 to a gypsum precipitation stage, generally designated as 32. The combined wash waters from filters 20 and 28 can be passed through line 34 and combined with the solution in line 30, or line 46, if desired. The combined wash waters can, for the reasons described above, be used to control the concentration of the phosphoric acid in the gypsum precipitation stage. The precipitation stage generally comprises a precipitator 36 and a sulfuric acid scavenger 44. Sulfuric acid is added to precipitator 36 through line 38 in an amount to provide an excess of sulfuric acid above the stoichiometric amount with respect to the monocalcium phosphate within this vessel. The sulfuric acid reacts with the monocalcium phosphate in precipitator 36 to produce calcium sulfate crystals and phosphoric acid, and a slurry of these materials is removed from precipitator 36 through line 42 and conveyed to scavenger 44 where a slip stream of the monocalcium phosphate-phosphoric acid-water solution from line 30 is introduced through line 46 to utilize the excess sulfuric acid present in precipitator 36 for precipitation of additional calcium sulfate. The calcium sulfate-phosphoric acid-water slurry is removed from scavenger 44 through line 48 and passed to a filter system 50, of conventional construction. The sulfuric acid is added to precipitator 36 in an amount stoichiometric with respect to the monocalcium phosphate in the solution in line 30; that is, the total solution taken from settler 24. The wash water in line 34 can be added to line 30, as shown, or, if desired, to line 46, to control the desired concentration of the solution in line 30, the excess of sulfuric acid to be added, etc.

Calcium sulfate is separated from the phosphoric acid in filter system 50 and the phosphoric acid solution produced is removed through line 52 to hold-up vessel 54. Product acid can be removed from vessel 54 through line 56. The phosphoric acid solution is also removed from vessel 54 through line 58, cooled in heat exchanger 60, if desired, and then passed to the attack stage 10 to provide the digesting acid feed for the attack stage. It can be desirable to decant the slurry in line 48 prior to filtering and thereby reduce filter loading. The decanted clear solution could be combined with the phosphoric acid solution in line 52 or 58. As discussed above, the temperature and concentration of the digesting acid and ratio of the acid to the rock are important variables. The ratio can be controlled by varying the amount of product acid removed from vessel 54. The concentration of the recycle acid can be controlled by the addition or removal of water from the product acid; for instance, in vessel 54 or line 58, as well as filters 20 and 28, and filter 50.

FIG. 2 shows the preferred process of this invention whereby a precipitate high in fluorine values can be obtained. The phosphoric acid stream after having the gypsum removed in filter 50 passes through line 52 into cooler 70 where the temperature is lowered such that sufficient fluoride values will precipitate out whereby the recycle acid will be able to solubilize essentially all fluorides in the rock; generally to about 70 to 95° F., preferably 75 to 90° F. This cooling will cause a precipitate to form which is rich in fluorides, generally being between 20 and 40 percent fluoride on a weight basis and the fluoride-rich precipitate will settle in settler 71 and be taken from the process through line 72. The acid stream is decanted off through line 73 to vessel 54. Water used to wash the gypsum filter 50 need not pass through the cooler and settler and can pass directly from the filter through line 74 into vessel 54. Heat exchanger 60 may be used as a heater or cooler to adjust the recycle portion of the phosphoric acid stream to the attack stage temperature. This rise in temperature will cause the acid stream to become unsaturated with respect to fluorine values in the rock and the acid stream in the attack stage will once again dissolve phosphates and fluorine values from the rock.

The embodiment of FIG. 3 shows a cooler 80 placed in line 30 so that the monocalcium phosphate-fluorine-phosphoric acid-water solution can be effectively cooled, generally to between 70 and 95° F. to cause fluorine values to precipitate in order to recover a precipitate rich in fluorides. This precipitate settles out in settler 81 and can be removed from the process through line 82. The phosphoric acid stream is decanted through line 83 and continues to the gypsum precipitator 36 as described above. As in the embodiment of FIG. 2, the heat exchanger 60 may be required to return the recycle acid to the temperature of the attack stage.

The precipitate taken through line 72 of FIG. 2 or through 82 of FIG. 3 will have a high fluoride content generally of the order of 20 to 40 percent and generally at least 25 percent by weight. The precipitate can be treated by known methods to produce hydrogen fluoride. Other sources of fluoride values in the process are found in the slime recovery from filter 28 and in the process of concentrating the phosphoric acid which is produced at about 30 percent to a more commercially accepted concentration of about 55 to 60 percent. While these latter sources do not provide the fluorides in the easily utilizable, concentrated form as the precipitates from 72 or 82 they should be considered as part of the overall amount of fluorine value which can be recovered.

Analysis of the fluoride values obtained as solids from the phosphate rock indicates that such fluorides are substantially free of $SiO_2$ and exist as simple $F^-$ ions. This can be a feed material for the generation of hydrogen fluoride by the typical reactions of:

(1) $2XF + H_2SO_4 \rightarrow 2HF + X_2SO_4$
(2) $XF_2 + H_2SO_4 \rightarrow 2HF + XSO_4$
or
(3) $2XF_3 + 3H_2SO_4 \rightarrow 6HF + X_2(SO_4)_3$ The following examples are included as typical of the results found by analyzing the precipitates from the process under varying conditions in accordance with the teachings of this invention.

EXAMPLE 1

Rock was reacted with a 30 percent $P_2O_5$ equilibrated acid solution at an acid to rock ratio of 15 to 1 at 145° F. After reacting the filtered material with a stoichiometric amount of sulfuric acid, the calcium sulfate was filtered off. The undiluted filtrate which passed into line 52 was divided into two portions. One was maintained at 145° F. for 12 hours while the second was allowed to attain room temperature (75° F.) and stand for 12 hours.

Analysis of the precipitates was as follows:

|  | Percent | |
| --- | --- | --- |
|  | 75° F. | 145° F. |
| Yield total precipitate | 0.41 | 0.21 |
| Analysis of precipitate: |  |  |
| $P_2O_5$ | 2.27 | 4.10 |
| $Al_2O_3/Fe_2O_3$ | 2.10 | 0.20 |
| $SiO_2$ | 0.10 | 0.50 |
| F | 29.5 | 7.7 |
| Ca | 12.8 | 21.3 |
| S | 8.56 | 14.7 |

These results show that the precipitate of the stream cooled in accordance with the process of FIG. 2 will have a fluorine content of about 30 percent, a considerable increase over that found when the process is maintained at 145° F.

EXAMPLE 2

Using the process shown in FIG. 3, a phosphate rock was reacted with a 30% $P_2O_5$ acid solution at an acid to rock ratio of 30 to 1. After the slime settled and the clear acid solution was obtained at 145° F., this was cooled to 80° F. The solids which precipitated out were analyzed to yield on a weight percent basis:

| | |
|---|---|
| Ca | 8.32 |
| S | 2.19 |
| F | 31.04 |
| $P_2O_5$ | 1.01 |
| $Al_2O_3/Fe_2O_3$ | 7.03 |
| $SiO_2$ | 0.0 |

Reheating of the acid to 145° F. would allow the recycle acid to place an equivalent amount of fluorine in solution once again.

EXAMPLE 3

Comparative data was obtained of the slime stream from filter 20 under conditions; (1) when the phosphoric acid stream entering the attack stage was completely equilibrated with respect to all rock components other than phosphates and (2) when the phosphoric acid stream entering the attack stage was fluorine unsaturated due to the stream having been cooled to 80° F. after filtering off the gypsum as in the process of FIG. 2. All other conditions were basically the same.

| Slime analysis | Completely equilibrated $P_2O_5$ stream | Percent by wieght F unsaturated stream |
|---|---|---|
| $P_2O_5$ | 7.76 | 1.83 |
| $Al_2O_3/Fe_2O_3$ | 2.60 | .67 |
| $CaF_2$ | | |
| $CaSO_4$ | 70.0 | |
| Ca | | 15.1 |
| F | 3.18 | 0.19 |
| S | | 7.77 |

These results taken in conjunction with the analysis of the precipitates of Examples 1 and 2 further show that essentially all of the fluorine values can be dissolved in the phosphoric acid stream and precipitated out a fluoride-rich precipitate which can be converted to hydrogen fluoride.

These examples are not intended to limit the application of the teachings contained herein but rather they are intended to show some specific improvements which are attainable through practice of the teachings.

It is claimed:

1. A process for the production of phosphoric acid and a precipitate rich in fluoride values from fluorine-containing phosphate rock comprising reacting the phosphate rock with phosphoric acid having a $P_2O_5$ concentration between about 20 to 50% in an attack stage at a temperature below about 180° F., said temperature and the time of reaction serving to dissolve a least about 90% of the tricalcium phosphate in the rock and produce a monocalcium phosphate-phosphoric acid-water solution up to about 90% saturated with monocalcium phosphate, and containing insoluble material, the weight ratio of $P_2O_5$ in the acid to $P_2O_5$ in the rock feed being sufficient to dissolve tricalcium phosphate values in the rock and provide the desired solution and at least about 7:1, separating the insoluble material from the solution, reacting sulfuric acid with said solution to produce phosphoric acid and precipitate calcium sulfate, the sulfuric acid being added in an amount essentially stoichiometric with respect to the monocalcium phosphate in the solution, separating the calcium sulfate from the phosphoric acid solution, cooling the acid solution to 95° F. or below to effect fluorine rich precipitation and prepare the solution to be able to effectively solubilize all fluorine value in the rock on recycle, removing a portion of the phosphoric acid as product, and recycling the phosphoric acid solution to the attack stage.

2. The process of claim 1 wherein the temperature in the attack stage is maintained below 150° F.

3. The process of claim 1 wherein the acid solution is cooled to between 70 and 95° F. in order to obtain the fluorine rich precipitate.

4. The process of claim 3 wherein the fluorine rich precipitate is effected by cooling the acid solution to 75 to 90° F.

5. The process of claim 1 wherein the precipitate contains between 20 and 40% fluorine on a weight basis.

6. The process of claim 1 wherein said phosphoric acid solution is adjusted to the temperature of the attack stage before recycling.

7. The process of claim 1 wherein the weight ratio of $P_2O_5$ in the acid to $P_2O_5$ in the rock is about 9 to 30:1.

8. A process for the production of phosphoric acid and a precipitate rich in fluoride values from fluorine-containing phosphate rock comprising reacting the phosphate rock with phosphoric acid having a $P_2O_5$ concentration between about 20 to 50% in an attack stage at a temperature below about 180° F., said temperature and the time of reaction serving to dissolve at least 90% of the tricalcium phosphate in the rock and produce a monocalcium phosphate-phosphoric acid-water solution up to about 90% saturated with monocalcium phosphate, and containing insoluble material, the weight ratio of $P_2O_5$ in the acid to $P_2O_5$ in the rock feed being sufficient to dissolve tricalcium phosphate values in the rock and provide the desired solution and at least about 7:1, separating the insoluble material from the solution, cooling the resultant solution to 95° F. or below to effect fluorine rich precipitation and prepare the solution to be able to effectively solubilize all fluorine value in the rock on recycle, reacting sulfuric acid with said solution to produce phosphoric acid and precipitate calcium sulfate, the sulfuric acid being added in an amount essentially stoichiometric with respect to the monocalcium phosphate in the solution, separating the calcium sulfate from the phosphoric acid-water solution, removing a portion of the phosphoric acid as product, and recycling the phosphoric acid solution to the attack stage.

9. The process of claim 8 wherein the temperature in the attack stage is maintained below 150° F.

10. The process of claim 8 wherein the monocalcium phosphate-phosphoric acid-water solution is cooled to between 70 and 95° F. in order to obtain the fluorine rich precipitate.

11. The process of claim 10 wherein the fluorine rich precipitate is effected by cooling the monocalcium phosphate-phosphoric acid-water solution to 75 to 90° F.

12. The process of claim 8 wherein the precipitate contains between 20 and 40% fluorine on a weight basis.

13. The process of claim 8 wherein said phosphoric acid solution is adjusted to the temperature of the attack stage before recycling.

14. The process of claim 8 wherein the weight ratio of $P_2O_5$ in the acid to $P_2O_5$ in the rock is about 9 to 30:1.

References Cited

UNITED STATES PATENTS

| | | | |
|---|---|---|---|
| 3,442,610 | 5/1969 | Mustian et al. | 23—165 |
| 2,531,977 | 11/1950 | Hammaren et al. | 23—122 |
| 3,420,622 | 1/1969 | Denges et al. | 23—88 |
| 2,636,806 | 4/1953 | Winter | 23—88 |
| 3,379,501 | 4/1968 | Treitler et al. | 23—165 |

OSCAR R. VERTIZ, Primary Examiner

G. A. HELLER, Assistant Examiner

U.S. Cl. X.R.

423—167, 320